(12) United States Patent
Jeong

(10) Patent No.: US 7,024,212 B2
(45) Date of Patent: Apr. 4, 2006

(54) METHOD FOR SERVING BROADCASTING TYPE SHORT MESSAGE IN RADIO DATA COMMUNICATION SYSTEM

(75) Inventor: Young-Jo Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 554 days.

(21) Appl. No.: 10/160,169

(22) Filed: Jun. 4, 2002

(65) Prior Publication Data

US 2002/0187795 A1   Dec. 12, 2002

(30) Foreign Application Priority Data

Jun. 8, 2001 (KR) .............................. 2001-32175

(51) Int. Cl.
*H04Q 7/20* (2006.01)
*H04M 11/10* (2006.01)

(52) U.S. Cl. .................................. 455/466; 455/412.1
(58) Field of Classification Search ................ 455/466, 455/414.3, 412.1
See application file for complete search history.

(56) References Cited

U.S. PATENT DOCUMENTS

| 4,706,082 | A  | * | 11/1987 | Miesterfeld et al. ...... 340/825.5 |
| 6,175,743 | B1 | * | 1/2001  | Alperovich et al. ........ 455/466 |
| 6,400,942 | B1 | * | 6/2002  | Hansson et al. ............ 455/466 |
| 6,571,112 | B1 | * | 5/2003  | Ramaswamy ............... 455/466 |
| 6,686,880 | B1 | * | 2/2004  | Marko et al. ............... 342/457 |

* cited by examiner

*Primary Examiner*—Sonny Trinh
*Assistant Examiner*—Marivelisse Santiago-Cordero
(74) *Attorney, Agent, or Firm*—Fleshner & Kim, LLP

(57) ABSTRACT

A method for providing a broadcasting-type short message in a radio communication system includes receiving a broadcasting-type short message, checking whether a password of a terminal manufacturing company exists in the received short message, and restoring the short message in the terminal if the password of the terminal manufacturing company exists. Preferably, the password is included in a first byte of the short message regardless of the length of the short message. If the password is included in the message, the terminal includes a display for displaying all or a portion of the information in the message. Through the use of this password, only terminals of the manufacturing company which sent the short message will be able to gain access the message. Terminals made by other manufacturing companies will be restricted from this access.

26 Claims, 4 Drawing Sheets

METHOD FOR SERVING BROADCASTING TYPE SHORT MESSAGE IN RADIO DATA COMMUNICATION SYSTEM

BACKGROUND OF THE INVENTION

1. Field of the Invention

The present invention relates to a short message service and particularly, to a method for serving a broadcasting type short message just to a mobile terminal of the manufacturing company.

2. Background of the Related Art

Short Message Service (SMS) is a kind of radio data communication service which transmits a simple short message using a mobile telephone system. It is similar to a paging service in that a text-type message in the form of one or more characters or numbers is received through a radio network. However, in case of the radio pager, messages are transmitted almost at real time since the message is sent through a base station after a user inputs the message. Therefore, if the pager is in a location where the electric wave cannot reach or the power is off when the message is sent from the base station, the message cannot be received.

Unlike radio pagers, in the case of SMS, after the message is stored in an apparatus called a Short Message Center (SMC) or Short Message Service Center (SMSC), the message is transmitted according to the condition of the terminal of the user. More specifically, if the terminal of the user is normally operated and there is room in a traffic channel, the message can be received in several seconds or minutes. Also, by using the mobile telephone network, the SMS service is a two-way service which can both receive and send short messages. Since the size of the message that can be transmitted at once is very small for the short message, it is called as a short message and the length of the message varies slightly according to the mobile telephone system being used.

SMS service is divided mainly to a broadcasting-type information service and a point-to-point service. The broadcasting-type information service is used when information having identical contents such as weather or news is transmitted to a plurality of terminals simultaneously. On the other hand, point-to-point service is one where one-to-one transmissions take place with a specific terminal.

Initial SMS service was used to provide a user with notice that there is a message stored in the voice mail box or to transmit a simple message. However, currently, an interactive information service is provided where simple information can be searched using a terminal and information is transmitted in two directions. Most recently, internetworking has been used. In this context, as the number of users of high-speed exclusive lines subject to flat-rate tariffs increases, the service for transmitting the SMS message through an inter-network becomes more attractive from the users' standpoint. At the initial stage, since each mobile communication service company freely provided the SMS transmission service through the inter-network, the service could be used by connecting to a service home page without additional cost.

However, as the service is increasingly abused for sending spam messages, and accordingly a load of the system is increased, mobile communication service companies have begun to limit transmission of the SMS through the inter-network. Therefore, only users, who are subscribers of the corresponding mobile communication service or who are registered as members, are permitted to send messages to users who use the same communication service.

FIG. 1 is a block diagram showing a conventional radio data communication system. This system includes a Short Message Entity (SME) 100 which is a processor for serving a broadcasting-type short message (SM) provided from the terminal manufacturing company; a Short Message Service Center (SMSC) 200 for storing the transmitted short message; a Home Location Register (HLR) 300 for checking information relating to the subscriber of a mobile terminal; a Visitor Location Register (VLR) 400 for checking the current location of the receiving side mobile terminal; a Mobile Switching Center (MSC) 500 and Base Station (BS) 600, for transmitting the received broadcasting-type short message to the next system; and a Mobile Terminal (MS) 700 for receiving and serving the broadcasting type short message. Broadcasting-type short messages include weather information, stock information or news information.

A method for serving broadcasting-type short messages to a mobile terminal 600 in a conventional radio communication system will now be described with reference to FIG. 2. The method begins with an information provider inputting a broadcasting-type short message provided by the terminal manufacturing company into the SME (S100). The short message entity 100 encodes the inputted short message to transmit the message to the SMSC 200, and then the encoded broadcasting-type short message is transmitted to the SMSC 200 (S110–S120).

The SMC 200, which received the broadcasting-type short message, transmits a terminal subscriber checking requesting signal to the HLR 300 (S130). The home location register 300, which receives the signal, transmits a subscriber checking signal of the MS 700 to the SMSC 200 (S140). The SMSC 200, which received the terminal subscriber checking signal, transmits a terminal location checking requesting signal to the VLR 400 to check the location of the MS 700 (S150). The VLR 400, which received the signal, checks the current location of the terminal and transmits the current location signal of the terminal to the SMSC 200 (S160).

The SMSC 200, which received the current location signal of the terminal, transmits the received broadcasting-type short message to the MSC 500 (S170). The MSC 500 transmits the received broadcasting-type short message to the BS 600 covering an area where the current MS is located (S180). The BS 600 then transmits the received broadcasting-type short message to the MS 700 through a forward channel (S190).

A traffic channel and paging channel exist between the BS 600 and MS 700 in the forward direction and an access channel exists in the reverse direction. In case the BS 600 transmits the broadcasting-type short message to the MS 700, the broadcasting-type short message is usually transmitted through the paging channel. However, in case the MS 700 is busy, the broadcasting-type short message is transmitted through the traffic channel. Also, the access channel, which is a reverse direction channel, is used to transmit a message transmission checking signal from the MS 700 to the BS 600.

The MS 700 which received the broadcasting-type short message, transmits the message transmission checking signal to provide notice that the broadcasting-type short message was transmitted without error to the SMSC 200 through the BS 600 and MSC 500 (S200–S220). The MS 700, which sent the message transmission checking signal, restores the received broadcasting-type short message and displays the message on a liquid crystal display unit (not shown) of a terminal (S230).

Conventional short message service (SMS) systems have at least one significant drawback. Since the broadcasting-type short message, which is provided by an inter-network site of a general terminal manufacturing company, is served to the mobile terminal of other terminal manufacturing companies as well as the MS 700 of the terminal manufacturing company, the MS 700 of the terminal manufacturing company cannot receive the service of information about its own terminal or the broadcasting-type short message.

SUMMARY OF THE INVENTION

An object of the invention is to solve at least the above problems and/or disadvantages and to provide at least the advantages described hereinafter.

In order to solve the above-mentioned problem, it is an object of the present invention to provide a method for serving a broadcasting-type short message in a radio data communication system, that is capable of providing this type of short message just to a mobile terminal which received a specific password of the terminal manufacturing company. In accordance with one embodiment, this password is inserted into the broadcasting-type short message at a short message center, at a time when the terminal manufacturing company broadcasts the message. Preferably, the password is included in a first byte of the short message regardless of the length of the message. If the password is included in the message, message, the terminal includes a display for displaying all or a portion of the information in the message. Through the use of this password, only terminals of the manufacturing company which sent the short message will be able to gain access to the message. Terminals made by other companies will be restricted from this access.

These and other objects and advantages of the present invention are achieved by providing a method for serving a broadcasting-type short message in a radio data communication system in accordance with steps that include: including a specific password of a terminal manufacturing company in a broadcasting-type short message, transmitting the broadcasting-type short message to a mobile terminal, and restoring the broadcasting-type short message in the terminal based on the specific password of the manufacturing company. The step of including the password in the broadcasting-type short message is preferably performed by the terminal manufacturing company which is providing the short-messages. Once the short-message is received and restored, the terminal may include a display for displaying information in the broadcasting-type short message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
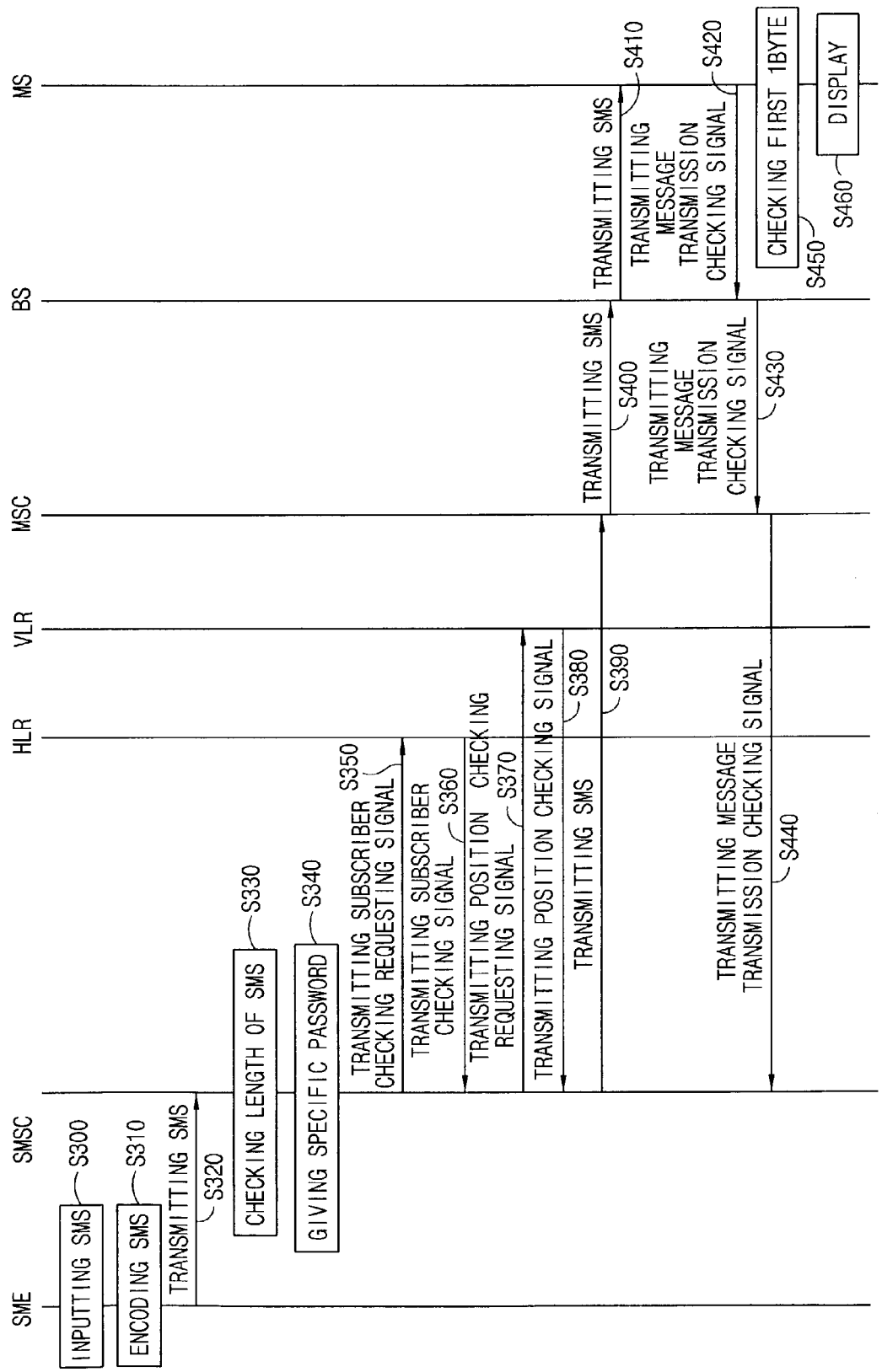
FIG. 3 is a diagram illustrating a method for providing a broadcasting-type short message in accordance with one embodiment of the present invention.
Figure 4:
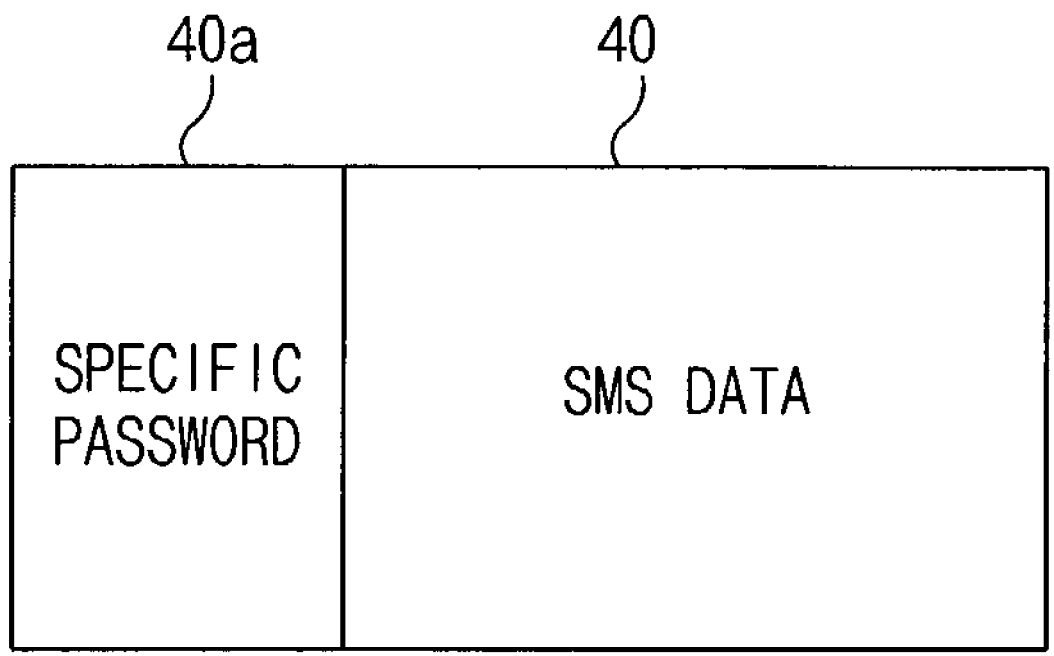
FIG. 4 is a diagram showing a format of the broadcasting-type short message provided in accordance with one embodiment of the present invention.

Reference will now be made to embodiments of the present invention, examples of which are illustrated in the accompanying drawings. In particular, the context of the present invention may be understood with reference to the conventional radio data communication system shown in FIG. 1. FIG. 3 shows steps included in a method for providing a broadcasting-type short message in accordance with one embodiment of the present invention. And, FIG. 4 shows a format of a short message provided in accordance with the present invention. As shown in FIG. 4, the short message includes a Short Message (SMS data) 40 in which the message information is located, and a specific password 40a indicating the terminal manufacturing company.

Figure 1:
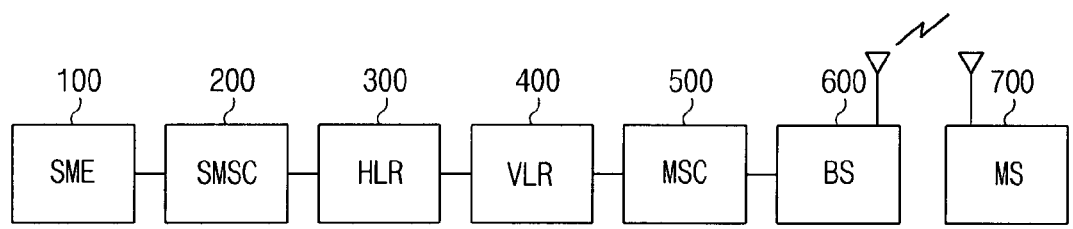
FIG. 1 is a diagram showing a conventional radio data communication system.
Figure 2:
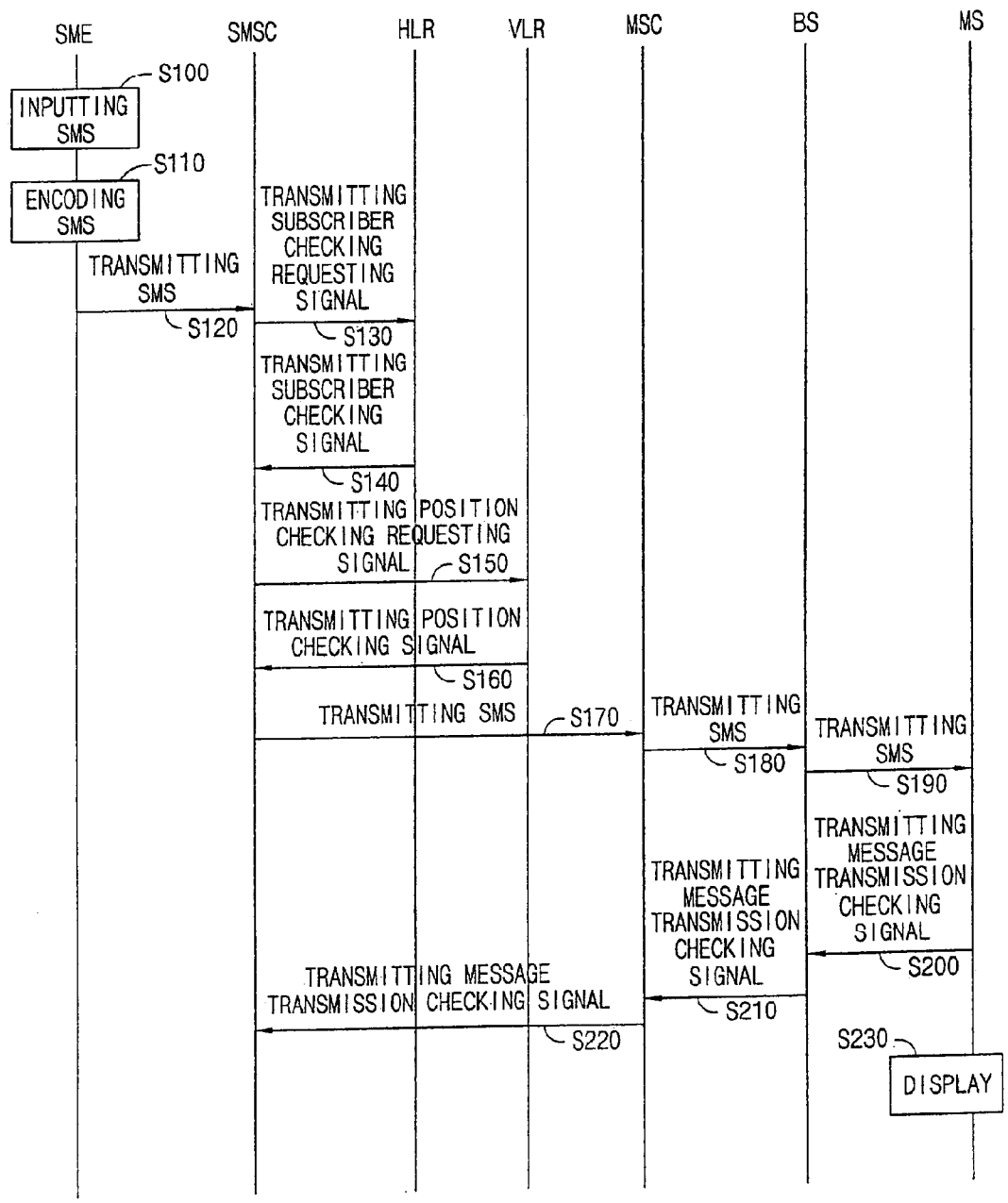
FIG. 2 is a diagram illustrating a conventional method for providing a broadcasting-type short message.

The method for providing a broadcasting-type short message to a mobile terminal (MS) 700 by the terminal manufacturing company in the radio data communication system, in accordance with the present invention, will now be described with reference to FIGS. 1, 3 and 4. In order to prepare for broadcast, an information provider of the terminal manufacturing company inputs a broadcasting-type short message which will be provided to the MS 700. The SME 100 encodes the short message inputted by the short message entity 100, and then transmits the message to the SMSC 200. These steps may be identical to the conventional process (S300–S320). Therefore, a detailed description about the process will be omitted.

The SMSC 200, which receives the broadcasting-type short message, checks the length of the received broadcasting-type short message and gives a specific password of the terminal manufacturing company to the first byte of the broadcasting-type short message (S330–S340). Preferably, the specific password indicating the terminal manufacturing company is given to the first byte regardless of the length of the broadcasting-type short message. Those skilled in the art can appreciate, however, that if desired the password may be included in any other byte of the broadcasting-type short message.

In the preferred embodiment, whether the length of the broadcasting-type short message is 80 bytes or 100 bytes, the specific password indicating the terminal manufacturing company is always given to the first byte. If the SMSC 200 receives an 80 byte-broadcasting-type short message from the SME 100, the SMSC 200 gives the specific password of the terminal manufacturing company to the first byte of the received 80 bytes. Therefore, the specific password of the terminal manufacturing company is stored in the first byte of the broadcasting-type short message and various information is stored in the remaining 79 bytes.

When the specific password of the terminal manufacturing company is stored in the first byte of the broadcasting-type short message, the SMSC 200 performs operations with the HLR 300 and VLR 400 to transmit the broadcasting-type short message to the MSC 500 as conventionally described (S350–S380).

The SMSC 200 checks the subscriber information of the MS 700 and its current location by the operation, and when the subscriber information of the MS 700 and the current location are checked, the SMSC 200 transmits the received broadcasting-type short message into the MSC 500 (S390). The MSC 500 transmits the received broadcasting-type short message into the BS 600 where the current MS 700 is located (S400). The BS 600 transmits the received broadcasting-type short message to the MS 700 by radio (S410).

The manner in which the broadcasting-type short message is transmitted to the mobile terminal may be identical to the conventional method, and accordingly a detailed description will be omitted. The manner in which the message transmission checking signal, which provides notice that the MS 700 received the broadcasting-type short message, is transmitted to the SMSC 200 through the base station 600 and mobile switching center 500 may be identical to the conventional process, and accordingly the description will be omitted (S420–S440).

The MS 700, which received the broadcasting-type short message, checks the first byte of the broadcasting-type short message to check whether the specific password of the terminal manufacturing company exists in the received broadcasting-type short message (S450). When it is determined that the first byte of the checked broadcasting-type short message contains a specific password of the terminal manufacturing company, the MS 700 decodes the first byte of the broadcasting-type short message, restores the remaining portion of the broadcasting-type short message, and displays the restored broadcasting-type short message and the message indicating the decoded terminal manufacturing company on the terminal liquid crystal display unit (not shown) (S460).

On the other hand, if the first byte of the checked broadcasting-type short message does not contain a specific password of the terminal manufacturing company, the MS 700 restores the received broadcasting-type short message and displays the message on the terminal liquid crystal display unit (not shown).

As described above, the system and method for providing a broadcasting-type short message service in a radio data communication system in accordance with the present invention provides service of information about the MS or service of the broadcasting-type short message relating to the MS of the terminal manufacturing company, by giving a specific password of the terminal manufacturing company to the broadcasting-type short message which will be transmitted.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for providing a broadcasting-type short message in a radio data communication system, comprising:
    storing a password identifying a mobile terminal manufacturing company that manufactures mobile terminals in a broadcasting-type short message provided by the terminal manufacturing company;
    transmitting the broadcasting-type short message to a plurality of mobile terminals; and
    restoring the broadcasting-type short message only in mobile terminals that are manufactured by the terminal manufacturing company identified in the password in the broadcasting-type short message.

2. The method of claim 1, wherein the storing includes:
    checking a length of the broadcasting-type short message; and
    storing the password of the terminal manufacturing company in a first byte of the broadcasting-type short message when the length-checking step is completed.

3. The method of claim 1, wherein the password of the manufacturing company is included in a first byte of the broadcasting-type short message.

4. The method of claim 3, wherein the restoring includes:
    receiving the broadcasting-type short message;
    checking whether the password of the terminal manufacturing company exists in the first byte of the received broadcasting-type short message; and
    restoring the broadcasting-type short message if the password of the terminal manufacturing company exists.

5. The method of claim 4, wherein the mobile terminal is given the password of the terminal manufacturing company.

6. The method of claim 5, further comprising displaying the broadcasting-type short message only in the mobile terminals that are manufactured by the terminal manufacturing company.

7. A method for serving a broadcasting-type short message in a radio data communication system, comprising:
    receiving a broadcasting-type short message;
    checking, in a mobile terminal, whether a password identifying a mobile terminal manufacturing company that manufactures mobile terminals exists in the received broadcasting-type short message; and
    restoring the broadcasting-type short message only in mobile terminals that are manufactured by the terminal manufacturing company identified in the password in the broadcasting-type short message.

8. The method of claim 7, wherein the password of the manufacturing company is included in a first byte of the broadcasting-type short message.

9. The method of claim 7, wherein the mobile terminal stores the password of the terminal manufacturing company.

10. The method of claim 7, wherein the password of the manufacturing company is included in a first byte of the broadcasting-type short message, regardless of a length of the broadcasting-type short message.

11. The method of claim 9, wherein the broadcasting-type short message is displayed only in the terminals in which the password of the terminal manufacturing company is stored.

12. The method of claim 1, further comprising:
    displaying, on the mobile terminal, information contained in the broadcasting-type short message restored by said restoring.

13. The method of claim 7, further comprising:
    displaying information contained in the broadcasting-type short message when the specific password exists.

14. A method for processing short messages, comprising:
    receiving a broadcast-type short message in a mobile terminal;
    determining whether the broadcast-type short message contains identification information, said identification information including a password of a manufacturer of mobile terminals;
    accessing the broadcast-type short message if the password of the manufacturer identifies a same manufacturer that manufactured the mobile terminal which received the broadcast-type short message; and
    denying access to the broadcast-type short message if the mobile terminal that received the broadcast-type short message is not manufactured by the same manufacturer identified by the password in the broadcast-type short message.

15. The method of claim 14, further comprising:
displaying information in the broadcast-type short message if the broadcast-type short message contains said identification information.

16. A method for generating short messages, comprising:
including identification information in a broadcast-type short message, said identification information identifying a manufacturer of a mobile terminal;
broadcasting the short message;
displaying the broadcast-type message only in mobile terminals that are manufactured by the same manufacturer identified in the identification information included in the broadcast-type short message.

17. The method of claim 16, wherein the including comprises:
storing said identification information in a predetermined byte of the broadcast-type short message.

18. The method of claim 17, wherein said identification information is stored in only said predetermined byte.

19. The method of claim 17, wherein said predetermined byte is a first byte of said broadcast-type short message.

20. The method of claim 17, wherein said identification information is included in said predetermined byte regardless of a length of the broadcast-type short message.

21. A mobile terminal for processing short messages, comprising:
means for receiving a broadcast-type short message; and
a processor which determines whether the identification information identifies a manufacturer of mobile terminals, and which accesses the broadcast-type short message only if the said identification information corresponds to the same manufacturer of a mobile terminal receiving the broadcast-type short message.

22. The mobile terminal of claim 21, further comprising:
displaying information in the broadcast-type short message only if the identification information corresponds to the same manufacturer of the mobile terminal.

23. A device for generating short messages, comprising:
a processor which stores identification information in a broadcast-type short message, said identification information identifying a manufacturer of a mobile terminal; and
a transmitter which transmits the broadcast-type short message to a plurality of mobile terminals,
wherein only mobile terminals that are manufactured by the identical manufacturer that is identified in the identification information of the broadcast-type short message process and display the broadcast-type short message and all other mobile terminals do not process and display the broadcast-type short message.

24. The device of claim 23, wherein said processor stores said identification information in a predetermined byte of the broadcast-type short message.

25. The device of claim 24, wherein said predetermined byte is a first byte of said broadcast-type short message.

26. The device of claim 23, wherein said processor stores said identification information in said predetermined byte regardless of a length of the broadcast-type short message.

* * * * *